United States Patent [19]

Wallace

[11] 4,009,888

[45] Mar. 1, 1977

[54] SELF-CONTAINED POWER CHUCK WITH CENTRIFUGALLY BALANCED JAWS

[75] Inventor: Walter Wallace, Kensington, Conn.

[73] Assignee: Cushman Industries, Incorporated, Hartford, Conn.

[22] Filed: Nov. 24, 1975

[21] Appl. No.: 634,621

[52] U.S. Cl. .................................. 279/1 C; 279/4; 279/119

[51] Int. Cl.² ......................................... B23B 31/14

[58] Field of Search ............... 279/1 C, 4, 119, 120

[56] References Cited

UNITED STATES PATENTS

| 2,729,459 | 1/1956 | Leifer | 279/1 C |
|---|---|---|---|
| 3,370,859 | 2/1968 | Benjamin et al. | 279/119 |

Primary Examiner—Othell M. Simpson
Assistant Examiner—Z. R. Bilinsky
Attorney, Agent, or Firm—Walter Spruegel

[57] ABSTRACT

A chuck having radially movable jaws and axially extending jaw-operating levers pivotally mounted intermediate their ends to form shorter and longer arms, of which the shorter arms are operatively connected with the jaws, and the longer arms provide counterbalances for the jaws and are in follower engagement with wedge surfaces on an inward flange formation on a sleeve piston in an outer ring-shaped power cylinder which lengthwise is more or less coextensive with the jaw-operating levers.

6 Claims, 3 Drawing Figures

SELF-CONTAINED POWER CHUCK WITH CENTRIFUGALLY BALANCED JAWS

This invention relates to chucks in general, and to self-contained power chucks with centrifugally balanced jaws in particular.

The present invention is concerned with self-contained power chucks of the type in which the jaws are operatively connected with their centrifugal counterbalances or weights through intermediation of levers which are combined with pivoted levers of typical bellcrank configuration that operatively connect a power-operated drawhead with the respective jaws. In prior chucks of this type the levers thus combined are customarily in the form of pivoted rockers, each having two opposed arms and a depending arm, all diverging from the pivot axis like the legs of a T, with one of the opposed arms carrying the counterbalance and the other being operatively connected with a jaw, and the depending arm being operatively connected with the drawhead. The self-contained power source in a chuck of this type is in the usual form of a cylinder in the chuck body in its rear or mounting end, and the piston therein is provided with a forwardly extending operating rod or sleeve which is connected with the drawhead in front of the cylinder. While a chuck of this type is highly advantageous by virtue of the combined features of a self-contained power source and centrifugal jaw balance, the embodiment of these features does entail a chuck structure of considerable size and weight. Thus, the operating cylinder, by being not only behind the drawhead but also spaced so far rearwardly from the jaw rockers as to leave sufficient space in front of the cylinder for accommodating the counterbalances in the rear of these rockers, adds considerably to the axial extent or "thickness" of the chuck, while the location of the drawhead between the inner ends of the jaw rockers, coupled with some substantial radial extent of the latter from the drawhead to their pivot mount, calls for a considerable cross-sectional body area that leaves the chuck with a fairly large outer diameter which is even larger if the chuck requires a through-hole.

It is among the objects of the present invention to provide a chuck of this type which has the combined features, and all the advantages, of prior chucks of this type in the matter of a self-contained power source and centrifugal jaw balance, but which is of considerably smaller size and less weight than these prior chucks in any event, and may even be comparable in its size and weight to a chuck which lacks either or even both of these features.

It is another object of the present invention to provide a chuck of this type in which each jaw rocker and associated counterbalance are combined into a single longitudinal operating lever which is pivotally mounted intermediate its ends to provide two opposed arms of different lengths, of which the shorter arm is operatively connected with a jaw and the longer arm provides the counterbalance and is also operatively connected with a drawhead, with the operating connection between the drawhead and each operating lever being a cam or wedge surface on the drawhead and a roller formation on the long arm of the operating lever which is in follower engagement with the wedge surface so that the latter will, on an axial operational shift of the drawhead in chuck-closing direction, rock the operating lever to bring the associated jaw into gripping engagement with work. With this arrangement, the longitudinal jaw operating levers in their disposition generally axially of the chuck are the key to a permissible appreciable reduction of the cross-sectional chuck area, in that the jaw actuating and balancing structure, i.e., the operating levers with their counterbalances and their operating connections with the jaws and the drawhead, may be confined within an annular cross-sectional chuck area of fairly narrow radial extent. Further, by making the longer arm of each operating lever of maximum length within the permissible axial chuck dimension, the roller formation and the counterbalance on this arm may be spaced from the pivot axis of the operating lever at an optimum distance at which the acting lever arm of the counterbalance requires minimum bulk and weight of the latter for jaw balance, and the acting lever arm of the chuck-closing wedge force applied by the drawhead to each operating lever may be kept sufficiently long so that on axially shifting the drawhead to its chuck-closing position with a force of even reasonably low magnitude, the wedge force on the operating levers will be fully adequate for a firm and secure grip of the associated jaws on work even at a sufficiently steep inclination of the wedge surfaces at which to permit desirably relatively extensive jaw opening and closing movement within a given operating range of the drawhead.

It is a further object of the present invention to provide a chuck of this type which is of double-acting performance, by providing the drawhead for each of the aforementioned jaw-operating levers with a pair of parallel wedge surfaces which are spaced apart to receive the roller formation on the associated lever in follower engagement therewith for operation of the chuck to grip work externally or internally.

Another object of the present invention is to provide a chuck of this type which is also of reduced axial extent or thickness, by arranging the contained power cylinder for the operating piston axially of the chuck more or less coextensive with the aforementioned jaw actuating and balancing structure, i.e., the longitudinal jaw-operating levers and their operating connections with the jaws and the drawhead, and by providing the drawhead directly on the operating piston intermediate its ends. With this arrangement, the power structure, i.e., the cylinder with the piston therein and its operating connection with the jaw-operating levers, is embodied in the chuck without appreciably, if at all, increasing the axial dimension of the chuck beyond that required if the chuck would be without contained power.

A further object of the present invention is to provide a chuck of this type in which the power cylinder, besides being axially more or less coextensive with the jaw actuating and balancing structure as aforementioned, is cross-sectionally ring-shaped about the chuck axis and arranged outside the annular cross-sectional chuck area in which the longitudinal jaw-operating levers with their counterbalances and their operating connections with the jaws and the drawhead are confined, and the drawhead is provided on the sleeve-type piston in the cylinder in the form of an inward flange formation in which the actuating wedge surfaces for the jaw-operating levers are formed. With this arrangement, the cylinder is sandwiched, preferably rather snugly, between the chuck periphery on the outside and the longitudinal jaw-operating levers with their counterbalances and drawhead connections on the inside, thereby to keep the spacing between the outer and inner peripheral walls of the ring-shaped cylinder chamber, i.e., its width, as large as the cross-sectional chuck area will permit and, hence, at an optimum at which the chuck-closing piston force is even at reasonably low pressure of the piston-operating fluid adequate for closing the jaws on work with a firm and secure grip, especially since the aforementioned longer arms of the jaw-operating levers afford an advantageous leverage medium in the power transmission to the jaws which will assure a firm work grip by the jaws even if the cross-sectional chuck area is kept fairly small and the width of the ring-shaped cylinder is correspondingly narrow. Further, by arranging the power cylinder more or less coextensive with the jaw actuating and balancing structure which is of considerable extent axially of the chuck in any event, the power cylinder may, without any increase in the axial chuck dimension, be easily kept at a length at which the piston therein may have a relatively long operating stroke for opening and closing movement of the jaws of considerable magnitude at any inclination of the wedge surfaces of the drawhead and even at a low inclination of these wedge surfaces at which the grip of the jaws on work is particularly forceful.

Further objects and advantages will appear to those skilled in the art from the following, considered in conjunction with the accompanying drawings.

In the accompanying drawings, in which certain modes of carrying out the present invention are shown for illustrative purposes:

Figure 2:
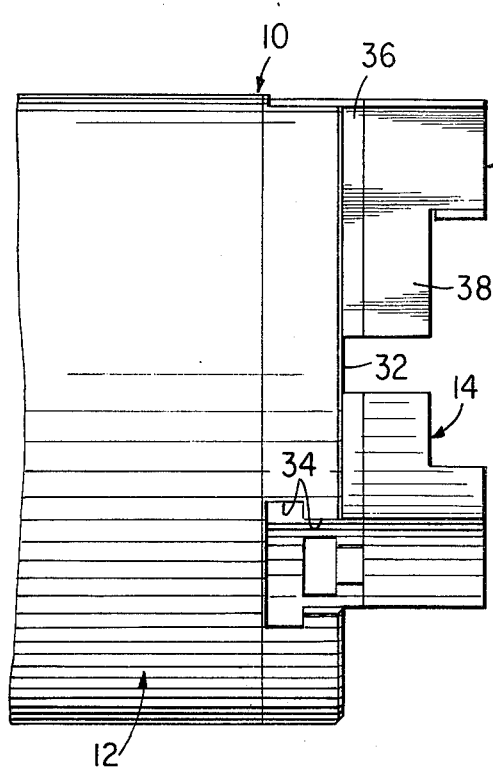
FIG. 2 is a fragmentary side view of the chuck.
Figure 1:
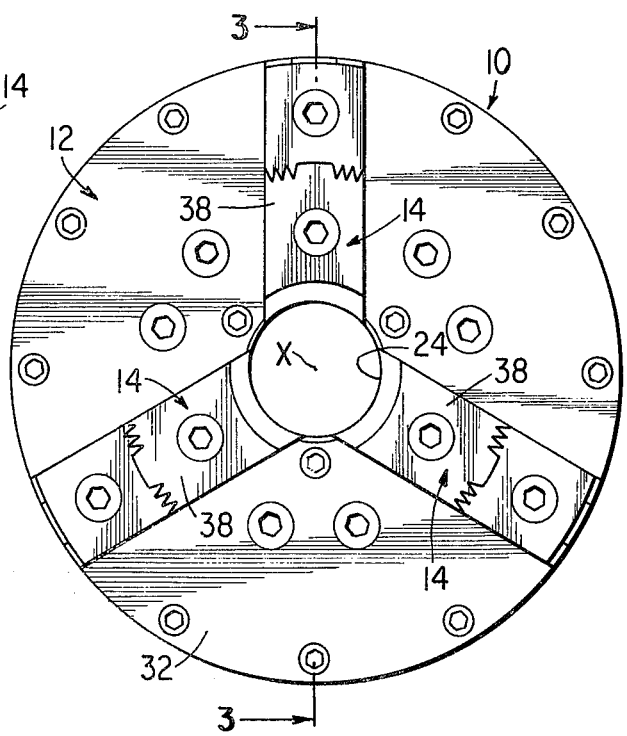
FIG. 1 is a front view of a chuck embodying the invention.

Referring to the drawings, the reference numeral 10 designates a chuck which has among its major components a chuck body 12, a plurality of jaws 14, jaw-operating levers 16, a power cylinder 18 with a piston 20 therein, and a drawhead 22 for actuating the jaw-operating levers 16.

The chuck body 12, which has a longitudinal axis x and is in this instance provided with a through-hole 24, is in its rear mounted at 26 on a preferably hollow power spindle 28 of a machine tool such as a lathe 30, for example. The chuck body is in its front face 32 provided with ways 34 for guidance of the jaws 14 for movement radially of the chuck axis x. Each of the jaws 14 provides in this instance a master jaw 36 and a top jaw 38 removably mounted on the master jaw 36 as at 40.

Figure 3:
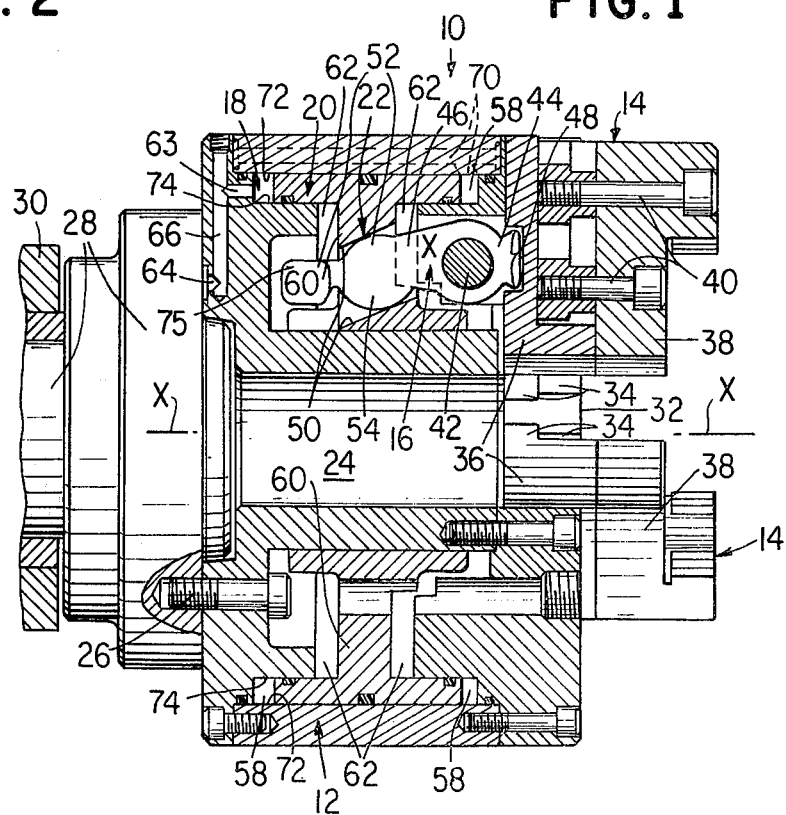
FIG. 3 is a section through the chuck taken substantially on the line 3—3 of FIG. 1.

The jaw-operating levers 16, one for each jaw 14, are at 42 pivotally mounted in the chuck body 12 about pivot axes x' which extend normal to the chuck axis x, with each operating lever providing on opposite sides of its pivot axis x' arms 44 and 46, respectively, which in accordance with one aspect of the invention extend substantially longitudinally of the chuck axis x (FIG. 3). The arms 44 of the levers 16 have operating connections 48 with the respective jaws 14, while the other arms 46 of these levers 16 are in follower engagement with cam formations 50 on the axially movable drawhead 22, and are provided with weights 52 for centrifugally balancing the jaws 14. The cam formations 50 on the drawhead 22 are in the preferred form of wedge surfaces which are inclined to the chuck axis x. With the present chuck being preferably double-acting, the drawhead 22 is provided with a pair of spaced parallel wedge surfaces 50 for each jaw-operating lever 16, and the arm 46 of each lever 16 is provided with a roller formation 54 which extends between, and is in follower engagement with, the spaced wedge surfaces of a pair (FIG. 3).

In accordance with another aspect of the invention, the arms 46 of the levers 16 are longer than the opposite arms 44 thereof, and the roller formations 54 and weights 52 on the longer lever arms 46 are provided substantially at the outer ends thereof, which leaves these weights 52 and roller formations 54 with effective lever arms of considerable length. In thus providing the weights 52 and roller formations 54 with effective lever arms of considerable length, jaw balance by the weights 52 is achieved advantageously at fairly small bulk of the latter, and a firm and secure grip of the jaws on work is achieved by the forces exerted by the wedge surfaces 50 of the drawhead 22 against the roller formations 54 on the levers 16 on axially shifting the drawhead into a chuck-closing position with a force which may be of reasonably low magnitude, with the ensuing advantage that the operating fluid for the power cylinder 18 may be under relatively low pressure even at a fairly steep inclination of the wedge surfaces 50 to the chuck axis x at which to permit relatively extensive jaw opening and closing movement within a given operating range of the drawhead 22.

The power cylinder 18 provides a chamber 58 which is cross-sectionally ring-shaped and slidably receives the piston 20 which is of sleeve-type. In accordance with another aspect of the invention, the ring-shaped cylinder chamber 58 is arranged, and preferably sandwiched rather snugly, between the outer chuck periphery and the annular cross-sectional chuck area in which the longitudinal jaw-operating levers 16 extend, and the cylinder chamber 58 is further arranged axially of the chuck more or less coextensive with the jaw-operating levers 16, and more particularly with the longer arms 46 thereof (FIG. 3). Further in accordance with the present invention, the drawhead 22 is combined with the sleeve-type piston 20 and is in the form of an inward flange formation 60 on the piston 20 intermediate its ends, with the wedge surfaces 50 being formed in the flange formation 60. The cylinder chamber 58 is interrupted intermediate its ends to provide a clearance gap 62 for axial shift of the flange-type drawhead into chuck opening and closing positions. Operating fluid is passed to and from the cylinder chamber 58 through suitable conduit connections with the opposite ends of the cylinder chamber and under the control of suitable valve mechanism, of which the conduit connections include conduits (not shown) in the hollow power spindle 28 and continuing passages 64 to 68 and 70 in the chuck body 12.

The arrangement of the jaw-operating levers 16 substantially longitudinally of the chuck is a key factor in permitting a chuck construction of fairly condensed cross sectional area. Further, the chuck may be kept at a fairly condensed cross-sectional area even with the embodiment of the power cylinder 18 which to this end is sandwiched rather snugly between the chuck periphery on the outside and the longitudinal jaw-operating levers with their counterweights and drawhead connections on the inside. Moreover, and still further to the same end of keeping the cross-sectional area of the chuck reasonably small, the outer and inner peripheral walls 72 and 74 of the ring-shaped cylinder chamber 58 have to be spaced apart only as much as is necessary for effecting closure of the jaws on work with a firm and secure grip at a reasonably low pressure of the piston-operating fluid and with the benefit of the substantial leverage in the power transmission to the jaws afforded by the longer arms 46 of the jaw-operating levers 16. Also, the chuck may be of relatively small axial extent or thickness by arranging the contained power cylinder axially of the chuck more or less coextensive with the jaw actuating and balancing structure, i.e., the longitudinal jaw-operating levers 16 and their operating connections with the jaws and the drawhead, and by providing the drawhead directly on the piston intermediate its ends. Thus, with this latter arrangement, the power structure, i.e., the cylinder 18 with the piston 20 therein and its wedge-type operating connections with the jaw-operating levers 16, is embodied in the chuck without appreciably, if at all, increasing the axial dimension of the chuck beyond that required if the chuck would be without contained power. Still further, and also by virtue of the arrangement of the power cylinder 18 more or less coextensive with at least the longer arms 46 of the jaw-operating levers 16 which are of considerable extent axially of the chuck in any event, the power cylinder 18 may, without any increase in the axial chuck dimension, be easily kept at a length at which the piston 20 therein may have a relatively long operating stroke for rather extensive opening and closing movement of the jaws at any inclination of the wedge surfaces 50 on the drawhead 22, and even at a low inclination of these wedge surfaces at which the grip of the jaws on work is particularly firm.

The counterweights 52 are formed in this instance by the rather massive roller formations 54 on the jaw-operating levers 16 near the outer ends of the longer arms 46 thereof, and by additional weights 75 at the very ends of these longer arms 46.

What is claimed is:

1. A chuck providing jaws; a body having a longitudinal axis and a front face with ways for guiding said jaws for movement radially of said axis; a cylinder chamber in said body cross-sectionally ring-shaped about said axis; a sleeve-type piston in said cylinder chamber; levers pivoted in said body about axes normal to said body axis and providing on opposite sides of their pivot axes first and second arms extending substantially longitudinally of said body axis, of which said first arms are operatively connected with said jaws, respectively, and said second arms are spaced closer from said body axis than said cylinder chamber; a drawhead on and projecting inwardly from said piston and having cam surfaces inclined to said body axis, with said second lever arms having follower surfaces in engagement with said cam surfaces, respectively, for moving said jaws into and from gripping engagement with work on movement of said piston in opposite directions; and weights on said second lever arms for centrifugally balancing said jaws.

2. A chuck as in claim 1, in which said second lever arms are substantially coextensive with said cylinder chamber lengthwise thereof.

3. A chuck as in claim 2, in which said follower surfaces and weights are provided on said second lever arms substantially at the outer ends thereof, and said second lever arms are longer than said first lever arms.

4. A chuck as in claim 1, in which said cam surfaces on said drawhead are pairs of wedge surfaces, of which the wedge surfaces of each pair are parallel and spaced from each other radially of said body axis, and said follower surface of each of said second lever arms is a roller formation fittedly received between the wedge surfaces of a pair.

5. A chuck as in claim 2, in which said drawhead is an inward flange formation on said piston intermediate its ends, said cam surfaces are pairs of wedge surfaces in said flange formation, of which the wedge surfaces of each pair are parallel and spaced from each other radially of said body axis, and said follower surface of each of said second lever arms is a roller formation fittedly received between the wedge surfaces of a pair.

6. A chuck as in claim 5, in which said roller formations are provided on said second lever arms near the outer ends thereof, and said outer arm ends are formed as parts of said weights on said second lever arms, with said roller formations being dimensioned to form substantially the remaining parts of said weights.

* * * * *